(12) United States Patent
Fukiharu

(10) Patent No.: US 6,603,519 B2
(45) Date of Patent: Aug. 5, 2003

(54) FRONT LIGHTING UNIT INCLUDING METAL LAYER ON PROTECTIVE COVER FOR CONCEALING ADHESIVE THAT ATTACHES LIGHT GUIDE AND PROTECTIVE COVER

(75) Inventor: Eiichi Fukiharu, Tokyo (JP)

(73) Assignee: NEC Corporation, Tokyo (JP)

( * ) Notice: Subject to any disclaimer, the term of this patent is extended or adjusted under 35 U.S.C. 154(b) by 114 days.

(21) Appl. No.: 09/795,550

(22) Filed: Feb. 28, 2001

(65) Prior Publication Data

US 2001/0028419 A1 Oct. 11, 2001

(30) Foreign Application Priority Data

Mar. 1, 2000 (JP) ......................... 2000-055323

(51) Int. Cl.[7] ..................... G02F 1/1335; G02F 1/1333; F21V 7/04
(52) U.S. Cl. ..................... 349/63; 349/61; 349/65; 349/58; 362/31
(58) Field of Search ........................ 349/61, 62, 63, 349/65, 153, 58; 362/31

(56) References Cited

U.S. PATENT DOCUMENTS

| | | | |
|---|---|---|---|
| 4,768,300 A | | 9/1988 | Rutili |
| 5,341,231 A | * | 8/1994 | Yamamoto et al. ........... 349/63 |
| 5,808,707 A | * | 9/1998 | Niibori et al. ............... 349/150 |
| 6,168,281 B1 | * | 1/2001 | Suzuki ........................ 349/63 |
| 6,204,898 B1 | * | 3/2001 | Maeda ........................ 349/58 |
| 2001/0022494 A1 | * | 9/2001 | Fujishiro ..................... 313/484 |

FOREIGN PATENT DOCUMENTS

| | | | | |
|---|---|---|---|---|
| JP | 10-161123 | 6/1998 | ......... | G02F/1/1335 |
| JP | 11-133419 | 5/1999 | | |
| JP | 11-174972 | 7/1999 | | |
| JP | 11-194339 | 7/1999 | | |
| JP | 11-218757 | 8/1999 | ......... | G02F/1/1335 |
| JP | 11-232919 | 8/1999 | ............. | F21V/8/00 |
| JP | 112376114 | 8/1999 | ......... | G02F/1/1333 |
| JP | 11-326903 | 11/1999 | ......... | G02F/1/1335 |
| JP | 11-344695 | 12/1999 | ......... | G02F/1/1333 |
| JP | 2000-29008 | 1/2000 | | |
| JP | 2000-89910 | 3/2000 | | |
| JP | 2000-162594 | 6/2000 | | |
| JP | 2000314874 | 11/2000 | ......... | G02F/1/1333 |
| JP | 20000305092 | 11/2000 | ......... | G02F/1/1339 |
| JP | 2001133774 | 5/2001 | ......... | G02F/1/1335 |
| WO | WO 99/63394 | 12/1994 | ......... | G02F/1/1335 |

* cited by examiner

*Primary Examiner*—Tarifur R. Chowdhury
(74) *Attorney, Agent, or Firm*—Michael Best & Friedrich, LLC

(57) ABSTRACT

A front lighting unit comprises a protective member fixedly attached to one side of a light conductive member to define therebetween a closed space. This closed space provides seal between the light conductive member and the protective member. A liquid crystal display incorporating the front lighting unit comprises a reflective liquid crystal panel. The light conductive a member is fixedly attached to one side of the liquid crystal panel.

4 Claims, 5 Drawing Sheets

FRONT LIGHTING UNIT INCLUDING METAL LAYER ON PROTECTIVE COVER FOR CONCEALING ADHESIVE THAT ATTACHES LIGHT GUIDE AND PROTECTIVE COVER

BACKGROUND OF THE INVENTION

1. Field of the Invention

The present invention relates to a front lighting unit and a liquid crystal display (LCD) using such a front lighting unit.

2. Description of the Related Art

Liquid crystal displays (LCDs) have been used in various kinds of devices including portable wireless communication units such as handheld wireless telephone sets.

FIG. 6 is a schematic longitudinal section of a portion of a handheld telephone showing a conventional LCD. In FIG. 6, the telephone has a casing including a front portion 601 and a back portion 602. By metal plating, a thin layer of metal 603 is formed on the front portion 601. A protective member in the form of a protective cover 604 is placed to cover an opening or window 605 of the front portion 601. Disposed between the front portion 601 and a back portion 602 is a translucent LCD panel 606 with a backlighting unit 607. The LCD panel 606 is formed over the backlighting unit 607.

To meet a request for portable wireless communication units to install color LCDs, it is recommendable to use a reflective color LCD, which is of low energy consumption. Reflective color LCD is needed especially in handheld telephones, which may be used in dark places. Reflective color LCD requires a front lighting unit. Examples of a LCD using a front lighting unit are described in JP-A 10-161123, JP-A 11-218757, JP-A 11-232919, JP-A 11-326903, and JP-A 11-344695.

In FIG. 6, a substrate of the LCD panel 606 uses glass. To prevent the substrate from breaking, there is a need for provision of sufficient amount of distance between the protective cover 604 and the LCD panel 606. It is also needed to use a protective cover with a sufficient amount of thickness around 1 mm for required strength. These make a further reduction in thickness difficult.

JP-A 11-344695 discloses a LCD employing a laminated structure of a transparent touch panel placed on a light conductive panel of a front lighting unit. Employing this structure, there is a reduction in thickness to some degree. The touch panel does not serve as a protective member.

An object of the present invention is to provide a front lighting unit that may make much contribution to a reduction in thickness of a liquid crystal display.

Another object of the present invention is to provide a liquid crystal display employing the front lighting unit.

SUMMARY OF THE INVENTION

According to one exemplary implementation of the invention, there is provided a front lighting unit comprising:

a light conductive member having one side; and a protective member fixedly attached to the one side of the light conductive member to define therebetween a closed space to seal between the light conductive member and the protective member.

According to another exemplary implementation of the invention, there is provided a liquid crystal display comprising:

a front lighting unit including a light conductive member having one side, and a protective member fixedly attached to the one side of the light conductive member to define therebetween a closed space to seal between the light conductive member and the protective member; and a liquid crystal panel having one side, the light conductive member of the front lighting unit being fixedly attached to the one side of the liquid crystal panel to define therebetween a closed space to seal between the light conductive member and the liquid crystal panel.

BRIEF DESCRIPTION OF THE DRAWINGS

The foregoing and other objects, features and advantages of the invention will be apparent from the following more particular description of exemplary embodiments of the invention as illustrated in the accompanying drawings. The drawings are not necessarily scale, emphasis instead being placed upon illustrating the principles of the invention.

DESCRIPTION OF THE PREFERRED EMBODIMENT

Figure 1:
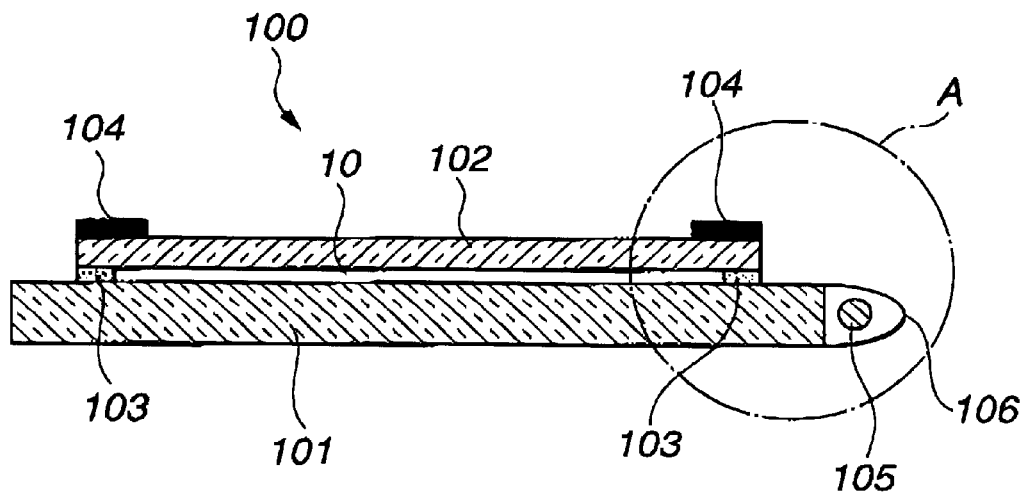
FIG. 1 is a schematic section of a front lighting unit according to the present invention.

Referring to the accompanying drawings, the same reference numerals are used to designate same or similar parts or portions throughout FIGS. 1 to 5 for the sake of brevity of description.

Referring to FIG. 1, a front lighting unit 100 has a light conductive member 101 and a light conductive protective member 102. The protective member 102 is fixedly attached to one side of the light conductive member 101 to define therebetween a space 10. The space 10 is closed to prevent entry of dust. This structure provides a required structural rigidity or strength with less thickness of the protective member 102.

In one embodiment, the light conductive member 101 is in the form of a transparent flat panel, and the protective member 102 is in the form a transparent protective cover. The protective cover 102 has a continuous area portion enclosing a predetermined area portion. At this continuous area portion, the protective cover 102 is fixedly attached in fluid tight manner to one side of the transparent flat panel 101. In the embodiment, an adhesive 103 is placed between the continuous area portion of the protective cover 102 and the one side of the transparent flat panel 101. A tape lined on each side with an adhesive may be used instead of the adhesive 103. A weld type joint may be used instead of the adhesive 103. The predetermined area portion, which is enclosed by the continuous area portion, of the protective cover 102, the adhesive 103, and the opposed area of one side of the transparent panel 101 cooperate with each other to define the closed space 10. In the embodiment, the transparent panel 101 is formed of acrylic resin, and the protective cover 102 is formed of polycarbonate.

Figure 2:
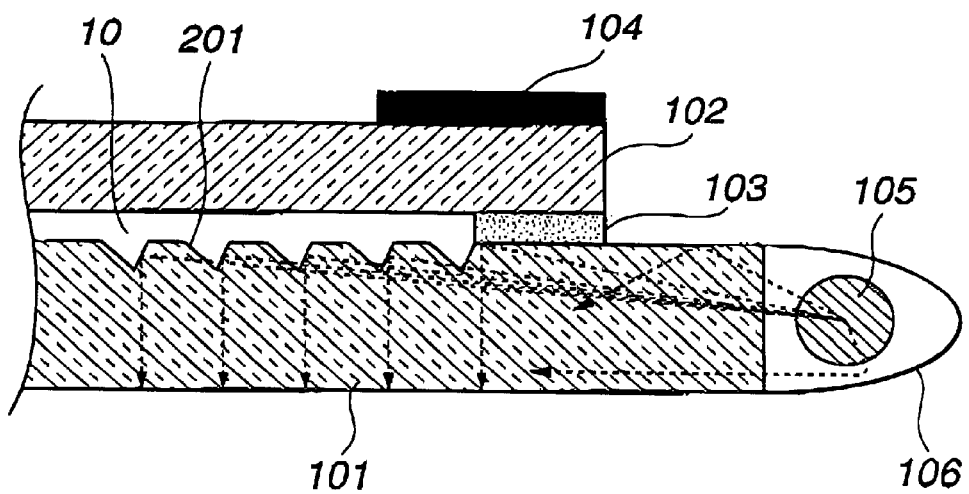
FIG. 2 is an enlarged view of a portion enclosed by a circle A in FIG. 1.

As best seen in FIG. 2, within the opposed area of the one side to the protective cover 102, the transparent panel 101 has an undulation 201 with a sawtooth waveform. The depth of each trench between the adjacent two waves ranges from 1 to 100 μm. The adhesive 103 has a flat appearance on each of one and opposite sides.

In the embodiment, the closed space 10 is sealed against entry of dust. To conceal the adhesive 103, a layer of metal 104 is formed on the protective cover 102 by plating.

A source of light 105 is provided in the neighborhood of edge of the transparent panel 101. The source of light 105 may be a single light emitting diode (LED) or a plurality of LEDs. A reflector plate 106 is provided to reflect light from the source of light 105 in a manner to direct the reflected light into the transparent panel 101.

Figure 3:
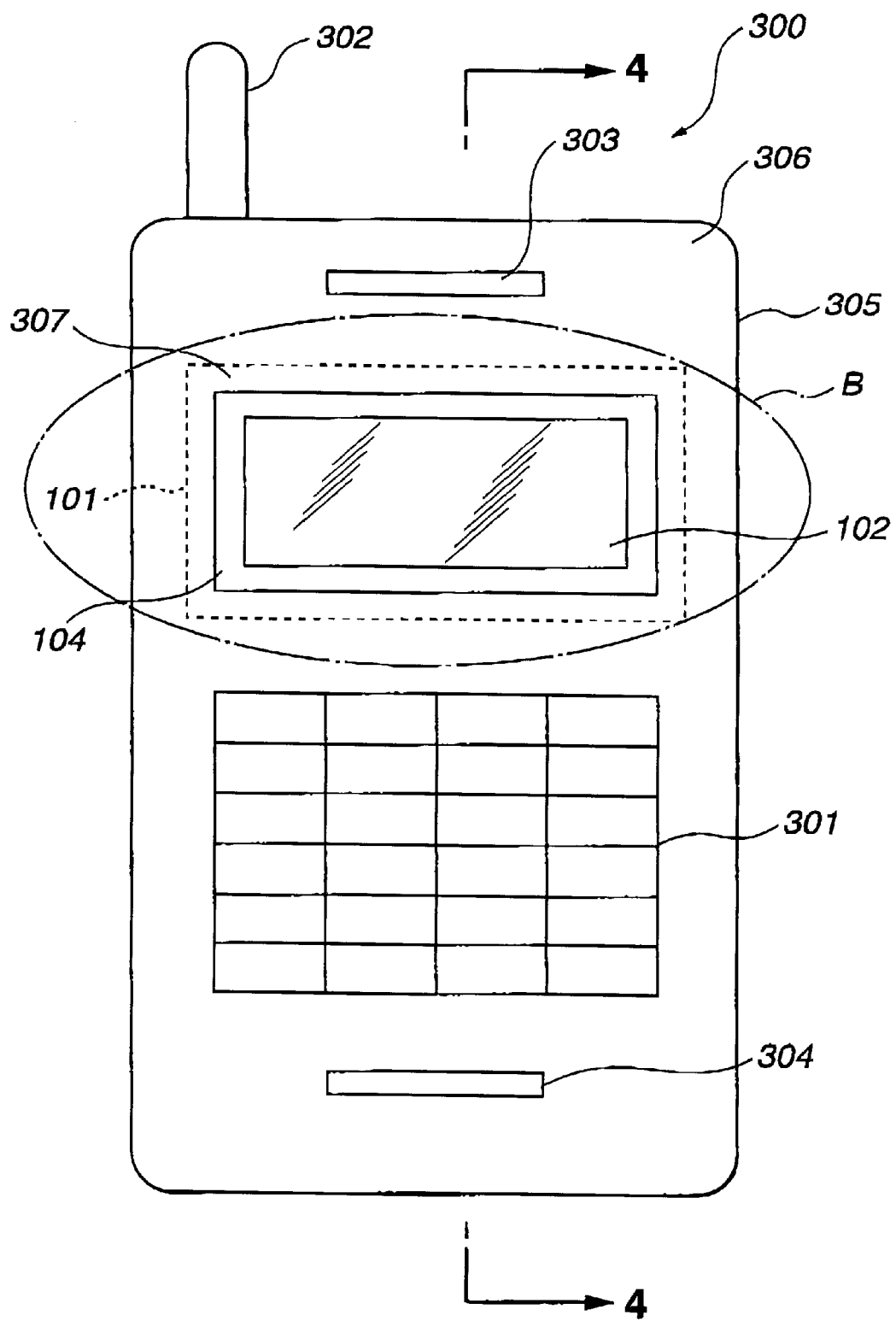
FIG. 3 is a plan view of a handheld telephone incorporating a LCD including a front lighting unit shown in FIG. 1.

The front lighting unit 100 may be installed in a handheld telephone 300 shown in FIG. 3.

Referring to FIG. 3, the handheld telephone 300 has a key pad 301, an antenna 302, a receiver 303, a transmitter 304, a casing 305 with a layer of metal 306, and a display 307.

Figure 4:
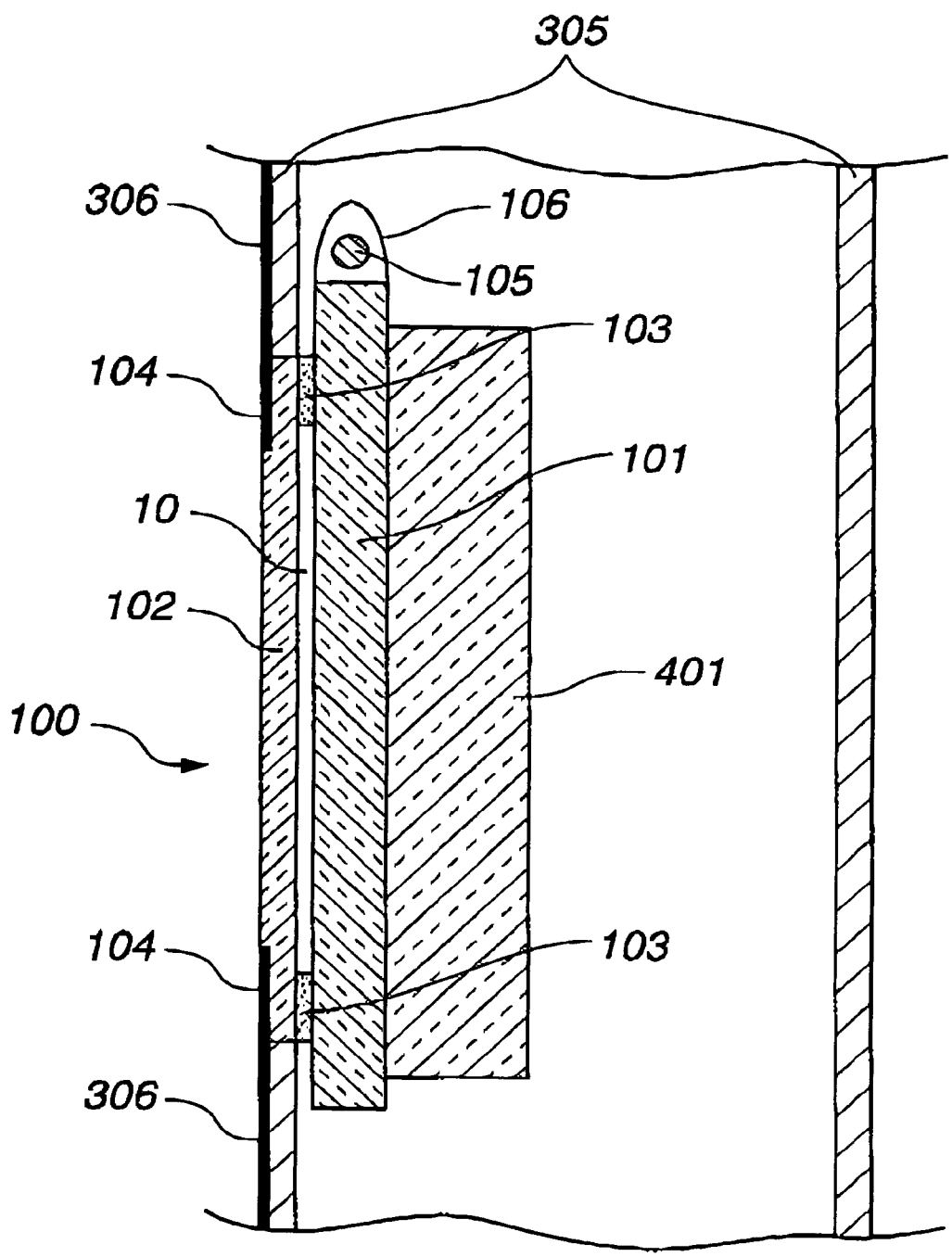
FIG. 4 is a section taken through the line 4—4 of a region enclosed by an ellipse B in FIG. 3, showing the LCD according to the present invention.

FIG. 4 is a section taken through the line 4—4 in FIG. 3 within the region enclosed by the ellipse B. If the front lighting unit 100 is installed, it is recommendable to use the same material and color in forming the layer of metal 104 and the layer of metal 306.

As readily seen from FIG. 4, the front lighting unit 100 plays a role of a front cover of the display 307 of the handheld telephone 300. On the back or rear side of the front lighting unit 100, a reflective liquid crystal panel 401 is provided. The reflective liquid crystal panel 401 includes, in the usual manner, a polarizing plate, a phase-contrast plate, a diffusion plate, a glass substrate, a color filter, transparent electrode, liquid crystal, reflective electrode, and a glass substrate, which are stacked to form a laminated structure.

Turning back to FIG. 2, light from the source of light 105 enters the transparent panel 101 directly or after being reflected by the reflector plate 106. Angles of incident rays are determined so that light travels through the transparent panel 101 generally in parallel to the both flat sides thereof. The transparent panel 101 of acrylic resin has a refractive index around 1.5 and a critical angle around 42 degrees. According to Snell laws of refraction, when light is incident on the boundary at an angle greater than the critical angle, the light is completely reflected from the boundary (total internal reflection). Since the sawtooth waveform of the undulation 201 is angled so that light from the source of light 105 is incident to the boundary at an angle greater than 42 degrees, most of light from the source of light 105 is reflected and incident to the reflective liquid crystal panel 401.

The light that is incident to the reflective liquid crystal panel 401 passes through the polarizing plate, phase-contrast plate, diffusion plate, glass substrate, color filter, and transparent electrode, and reflected by reflective electrode. The reflected light passes through substantially the same path in the reverse order to reach the transparent panel 101, and passes through the transparent panel 101 and the protective cover 102 to reach eyes of an operator of the handheld telephone 300.

According to the embodiment, the protective cover 102 is fixedly attached to the transparent panel 101 to define the closed very narrow space 10 to provide the integral structure. This integral structure has accomplished close arrangement of the protective cover 102 and the transparent panel 101, required strength with less thickness of the protective cover 102. Since the space 10 is closed and sealed, entry of dust is completely prevented.

Figure 5:
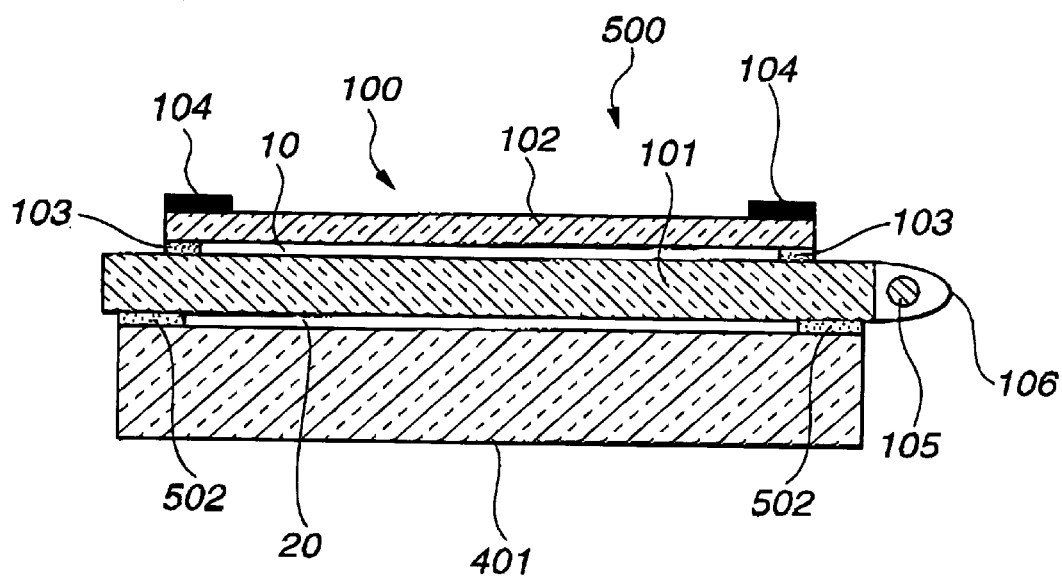
FIG. 5 is a schematic section of a LCD according to the present invention.
Figure 6:
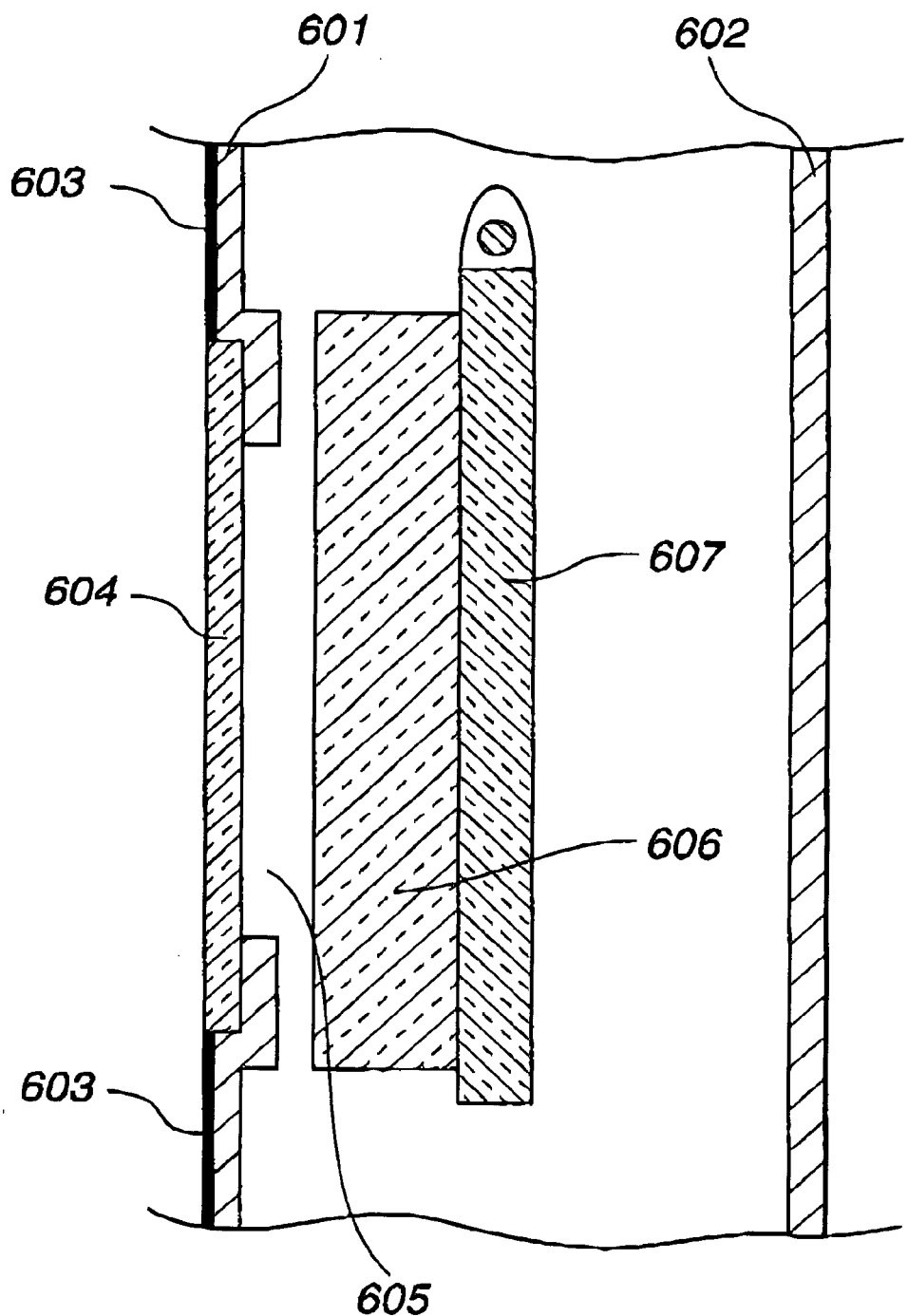
FIG. 6 is a schematic longitudinal section of a portion of a handheld telephone, showing the before discussed LCD.

FIG. 5 is a similar view to FIG. 4, showing another embodiment of a LCD 500 incorporating a front lighting unit 100 shown in FIGS. 1 and 2. The LCD 500 is substantially the same as the LCD shown in FIG. 4. Thus, the same reference numerals as used to designate the same parts or portions in FIGS. 4 and 5 for the sake of brevity of description.

The LCD 500 is different from the LCD shown in FIG. 4 in that a light conductive member 101 of the front lighting unit 100 is fixedly attached to one side of a reflective liquid crystal panel 401 to define therebetween a space 20. The space 20 is closed and sealed to prevent entry of dust. In FIG. 5, the light conductive member 101 is in the form of a transparent flat panel. The transparent flat panel 101 has a continuous area portion enclosing a predetermined area portion. At this continuous area portion, the transparent flat panel 101 is fixedly attached in fluid tight manner to one side of the reflective liquid crystal panel 401. In the embodiment, an adhesive 502 is placed between the continuous area portion of the transparent flat panel 101 and the one side of the reflective liquid crystal panel 401. A tape lined on each side with an adhesive may be used instead of the adhesive 502. A weld type joint may be used instead of the adhesive 502. The predetermined area portion, which is enclosed by the continuous area portion, of the transparent flat panel 101, the adhesive 502, and the opposed area of one side of the reflective liquid crystal panel 401 cooperate with each other to define the closed space 20.

The LCD 500 is advantageous over the LCD shown in FIG. 4 in that entry of dust between the light conductive member 101 and the reflective liquid crystal panel 401 is prevented in addition to the arrangement to prevent entry of dust between the protective member 102 and the light conductive member 101.

Another advantage is that the front lighting unit 100 is fixedly attached to the reflective liquid crystal panel 401 to provide an integrated structure.

The present invention is applicable not only to non-color LCD but also to color LCD.

While the present invention has been particularly described, in conjunction with preferred embodiments, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

What is claimed is:

1. a handheld telephone, comprising:
    a casing with a first layer of a first metal material and a first color;
    a display including a front cover in the form of a front lighting unit;
    the front lighting unit including:
        a light conductive member having one side and an edge,
        an adhesive on the one side of the light conductive member,
        a protective cover on the adhesive and fixedly adhered to the one side of the light conductive member,
        the light conductive member, the adhesive and the protective cover cooperating with each other to define between the light conductive member and the protective cover a closed space,
        a second layer of metal of the first material and the first color, the second layer of metal being formed on the protective cover and extending from the first layer of metal to conceal the adhesive, a source of light provided in the neighborhood of the edge of the light conductive member, and a reflector reflecting light from the source of light into the light conductive member through the edge.

2. The handheld telephone as claimed in claim 1, wherein the second layer of metal is formed by plating.

3. The handheld telephone as claimed in claim 2, wherein the adhesive includes a tape lined on each side with adhesive.

4. The handheld telephone as claimed in claim 1, further comprising a reflective liquid crystal panel attached to the other side of the light conductive member.

* * * * *

UNITED STATES PATENT AND TRADEMARK OFFICE
CERTIFICATE OF CORRECTION

PATENT NO. : 6,603,519 B2
DATED : August 5, 2003
INVENTOR(S) : Eiichi Fukiharu

It is certified that error appears in the above-identified patent and that said Letters Patent is hereby corrected as shown below:

<u>Title page, Item [54] and Column 1, line 1,</u>
Delete "FRONT LIGHTING UNIT INCLUDING METAL LAYER ON PROTECTIVE COVER FOR CONCEALING ADHESIVE THAT ATTACHES LIGHT GUIDE AND PROTECTIVE COVER" and insert -- REDUCTION IN THE THICKNESS OF FRONT LIGHTING UNIT --;

Signed and Sealed this

Twenty-second Day of June, 2004

JON W. DUDAS
*Acting Director of the United States Patent and Trademark Office*